(No Model.)

H. D. PERKY & W. H. FORD.
MACHINE FOR THE PREPARATION OF CEREALS FOR FOOD.

No. 502,378. Patented Aug. 1, 1893.

WITNESSES:
A. S. Miller
Belle Stewart

INVENTORS
William H. Ford.
Henry D. Perky.

UNITED STATES PATENT OFFICE.

HENRY D. PERKY AND WILLIAM H. FORD, OF WATERTOWN, NEW YORK, ASSIGNORS, BY DIRECT AND MESNE ASSIGNMENTS, TO THE CEREAL MACHINE COMPANY, OF COLORADO.

MACHINE FOR THE PREPARATION OF CEREALS FOR FOOD.

SPECIFICATION forming part of Letters Patent No. 502,378, dated August 1, 1893.

Application filed October 29, 1892. Serial No. 450,395. (No model.)

*To all whom it may concern:*

Be it known that we, HENRY D. PERKY and WILLIAM H. FORD, citizens of the United States, residing at Watertown, in the county of Jefferson, State of New York, have invented certain new and useful Improvements in Machines for the Preparation of Cereals for Food, of which machine the following description, in connection with the accompanying drawings, is a specification, like letters on the drawings representing like parts.

The object of our invention is the economic reduction of cereals in the grain state to desirable forms of food without detracting from their natural nutritious qualities and virtue and for the better preparation of the same for more convenient and general use. These objects are attained by the mechanism illustrated in the accompanying drawings, in which—

Figure 1:
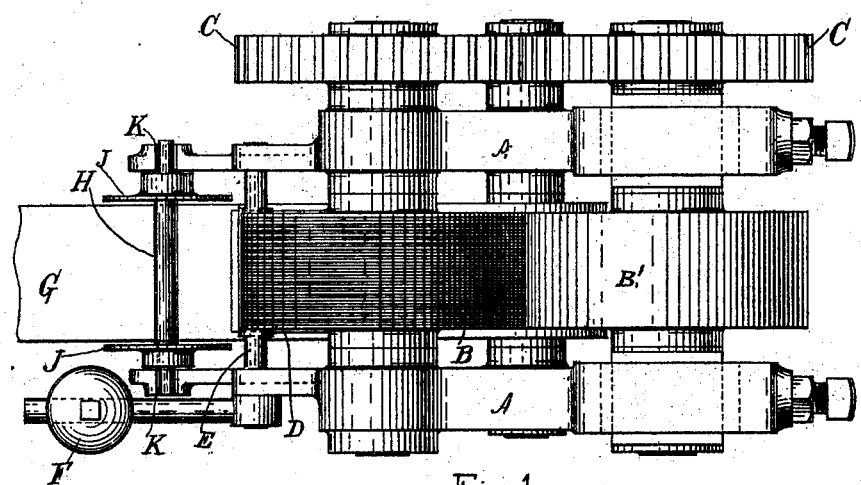
Figure 2:
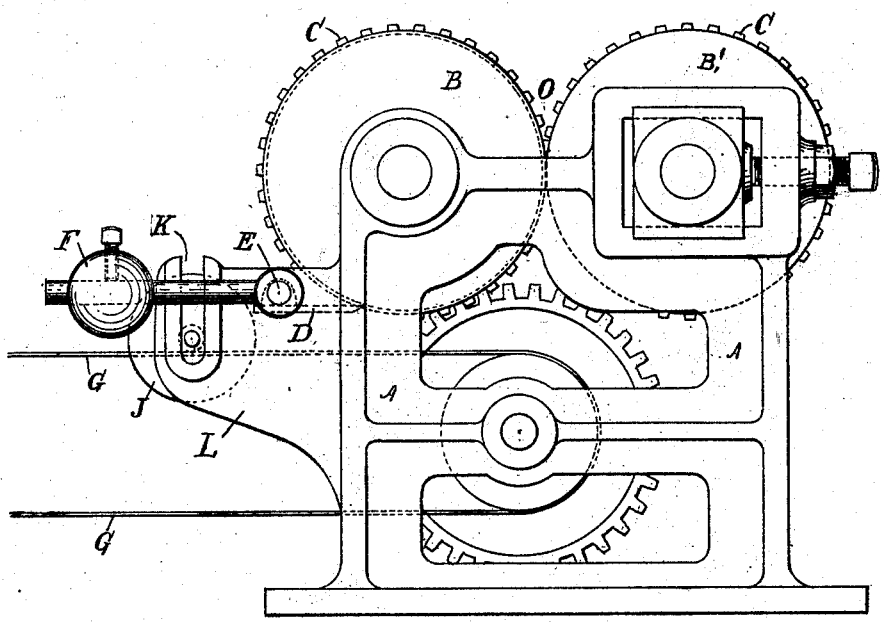
Figure 3:
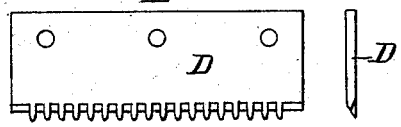
Figure 4:

Figure 1 is a plan view; Fig. 2 an elevation. Figs. 3 and 4 are details of a scraper.

A is a frame supporting the moving parts.

B and B' are two rolls one or both of which are to be grooved circumferentially. Only one marked B is so shown in the drawings. The said rolls are geared together by gears C. C. and may be driven by any convenient power. Roll B is shown with rigid journal bearings while B' is shown with adjustable bearings so that the desired proximity or contact may be maintained between the faces of the two rolls.

D is a scraper having teeth so formed as to fit in the grooves in roll B and between the teeth the said scraper is to fit the cylindrical faces of the divisions separating said grooves. This scraper D is fixed upon a spindle E and is held in contact with roll B by the weight F upon an arm attached to the spindle E. The said scraper may be held in contact with said roll by other convenient means.

G is a conveyer belt.

H is a spindle having loose collars J. J. This spindle plays in vertical slots K. K. of the brackets L. L.

The operation of this machine is as follows: The grain being properly prepared by boiling, steaming, steeping or soaking and the outer shell being removed when desired, is fed in any convenient manner between the rolls B and B' at O by which it is compressed into the grooves on roll B from which the product in the form of threads, lace or ribbons or sheets, &c., (the form of which depending on the contact or proximity of rolls B and B') is removed by scraper D where it is received by the belt G and carried forward to the spindle H around which the product is wound by the frictional action of the belt against the product; the spindle rising in the slots as the size of the roll increases. If desired the product may be conveyed without winding upon the spindle to any convenient receptacle.

What we claim, and desire to secure by Letters Patent, is—

1. In a machine for the preparation of cereals for food, the combination with a pair of compressing rolls, one of which is provided with circumferential grooves, of a comb-like scraper the teeth of which are arranged to fit said grooves, the spaces between said teeth being arranged to fit the cylindrical faces of the divisions separating said grooves, substantially as specified.

2. In a machine for the preparation of cereals for food, the combination of a pair of circumferentially grooved rolls, the comb-like scraper therefor, the conveyer belt, and the spindle H hung in slotted bearings, over said belt, substantially as specified.

3. In a machine for the preparation of cereals for food, the combination with a pair of compressing rolls, one of which is formed with circumferential grooves, the comb-like scraper therefor, and the weight for holding said scraper in contact with said roll, of the conveyer belt, traveling underneath said grooved roll, and the spindle H journaled in bearing slots over said belt and designed to have frictional contact therewith, substantially as specified.

In testimony whereof we have signed our names to this specification in presence of two subscribing witnesses.

HENRY D. PERKY.
                  WILLIAM H. FORD.

Witnesses:
  D. S. MILLER,
  BELLE STEWART.